United States Patent [19]

Wallace

[11] 4,416,265

[45] Nov. 22, 1983

[54] SOLAR COLLECTOR

[76] Inventor: John G. Wallace, Box 55a, Rte. 1, Mound City, Kans. 66056

[21] Appl. No.: 331,187

[22] Filed: Dec. 16, 1981

[51] Int. Cl.$^3$ .............................................. F24J 3/02
[52] U.S. Cl. .................................. 126/446; 126/448; 126/450; 165/171; 165/175
[58] Field of Search .............. 126/442, 446, 447, 448, 126/449, 450; 165/168, 171, 172, 173, 175, 177

[56] References Cited

U.S. PATENT DOCUMENTS

| | | | |
|---|---|---|---|
| 3,972,317 | 8/1976 | Gallagher | 126/446 |
| 3,987,784 | 10/1976 | Godrick | 126/448 |
| 4,011,856 | 3/1977 | Gallagher | 126/446 |
| 4,027,652 | 6/1977 | Collura | 126/446 |
| 4,060,070 | 11/1977 | Harter | 165/171 |
| 4,106,483 | 8/1978 | Barker, Jr. | 126/450 |
| 4,141,339 | 2/1979 | Weinstein | 126/449 |
| 4,164,935 | 8/1979 | Marles | 165/171 |
| 4,172,444 | 10/1979 | Atkinson | 165/168 |
| 4,180,055 | 12/1979 | Hudnall | 165/171 |
| 4,201,188 | 5/1980 | Cummings | 126/429 |
| 4,201,193 | 5/1980 | Ronc | 126/448 |
| 4,205,658 | 6/1980 | Clark | 126/444 |
| 4,224,926 | 9/1980 | Bowden | 126/448 |
| 4,228,790 | 10/1980 | Davison | 126/444 |
| 4,338,921 | 7/1982 | Harder | 126/447 |
| 4,345,587 | 8/1982 | Carvalho | 126/446 |

*Primary Examiner*—Daniel J. O'Connor
*Attorney, Agent, or Firm*—Litman, Day & McMahon

[57] ABSTRACT

A solar collector for integral attachment to framing members of a structure comprising a base panel attached to and extending between an adjacent pair of the framing members. The collector includes collector plate which comprises an inlet and an outlet end, a web with opposite side margins and a tubular fluid conduit terminating and open at the collector plate ends. Attachment means is provided for slidably retaining the collector plate to the base panel whereby relative movement therebetween is allowed in response to thermal expansion and contraction of the collector plate. A transparent cover is attached to the framing members and positioned in spaced relation outwardly of the collector plate.

2 Claims, 5 Drawing Figures

U.S. Patent  Nov. 22, 1983  Sheet 1 of 2  4,416,265
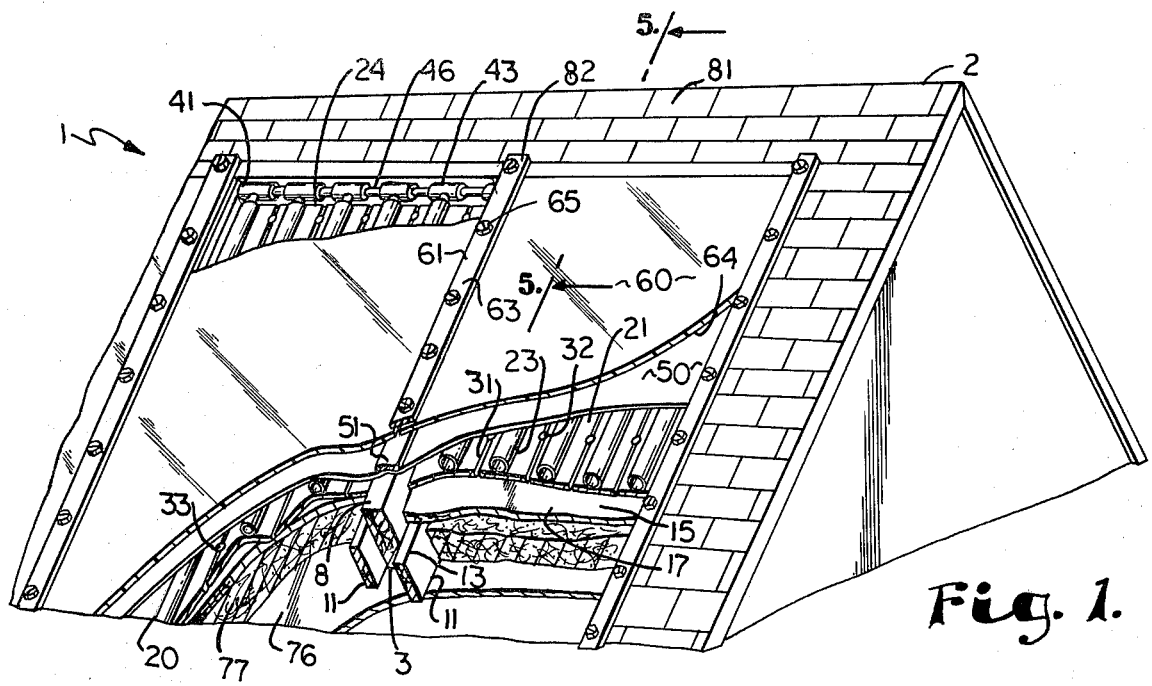
Fig. 1.
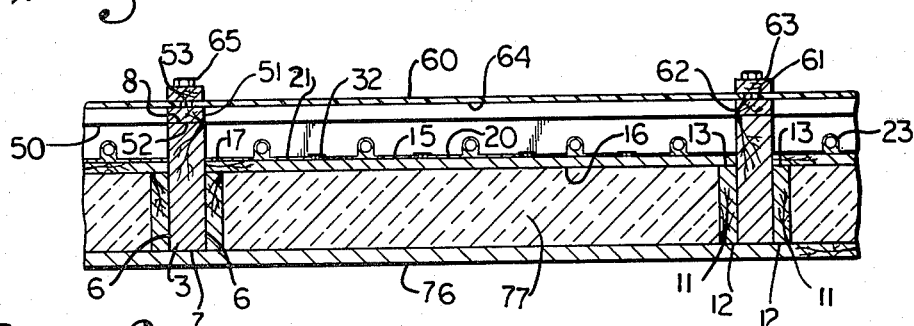
Fig. 2.
Fig. 3.
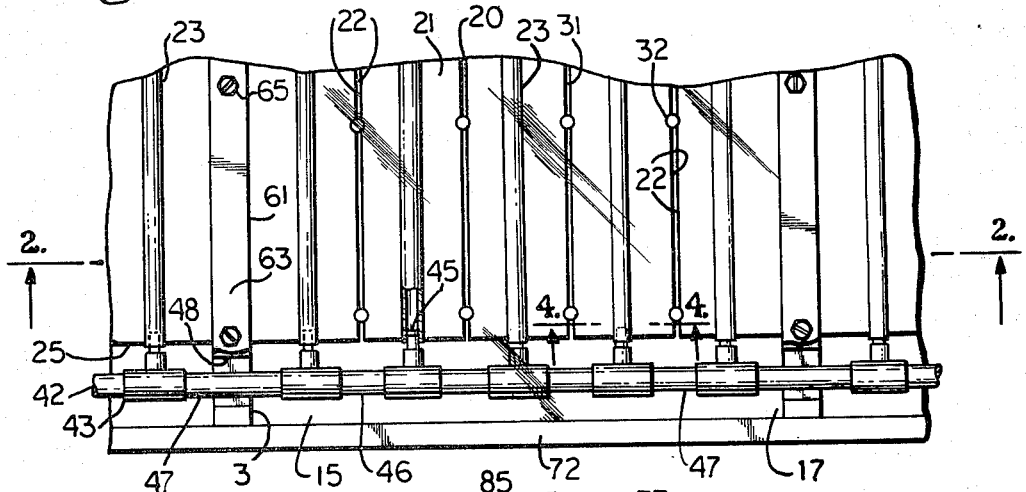
Fig. 4.

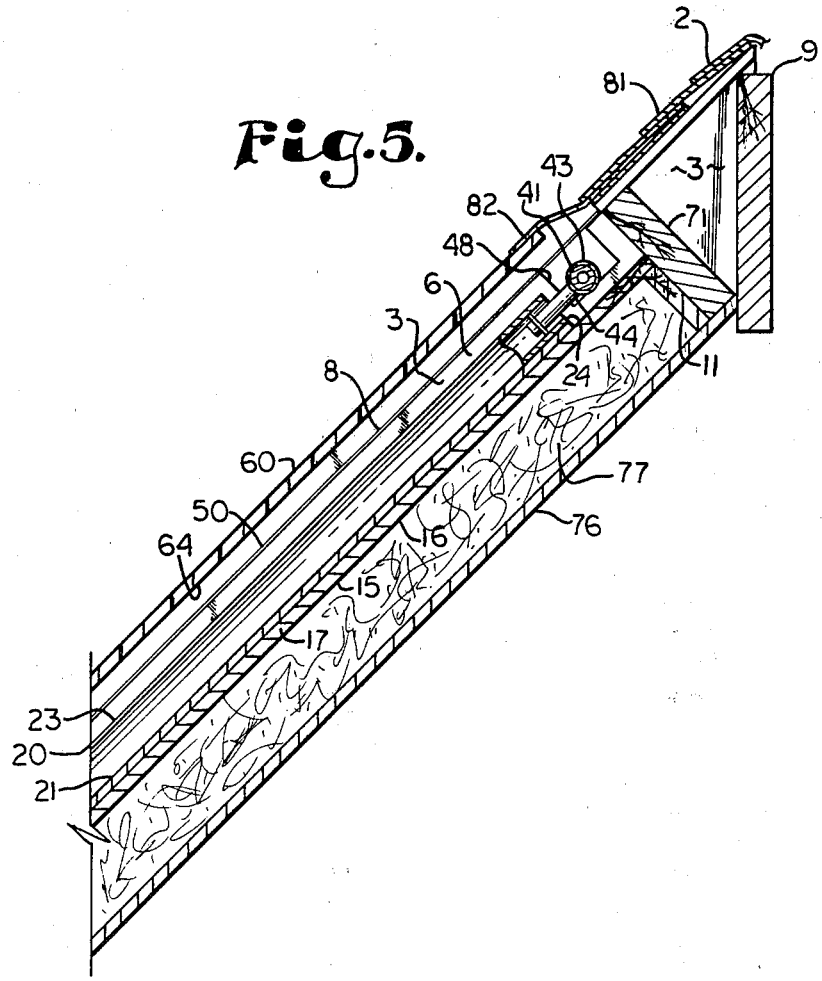

SOLAR COLLECTOR

BACKGROUND OF THE INVENTION

1. Field of the Invention

This invention relates to solar collectors and in particular to a solar insolation collector which is incorporated into and integral with a structure.

2. Description of the Prior Art

Solar collectors are well known in the prior art and a variety of such devices have been developed for receiving insolation from the sun and heating a transfer fluid, such as air or water. Such transferred heat may be utilized for a variety of purposes, including space heating, heating of domestic hot water supplies, and absorption air conditioning. A type of prior art solar collector, commonly referred to as a "flat plate" collector, comprises a self-contained rectangular frame with a transparent outer cover of, for example, glass or clear plastic. A heat absorbing surface is provided below the cover and is typically in contact with conduits or other means for conveying the transfer fluid through the collector for receiving by convection the absorbed heat. The frame generally includes an inner cover with a thermally insulative material positioned between the inner cover and the collector plate for preventing heat loss from the collector assembly. Inlet and outlet ports are provided for communicating the heat transfer fluid with the collector.

A predetermined number of such flat plate collectors designed to provide sufficient heat absorption surface are generally placed on the finished, weathertight roof of a structure. However, because such prior art flat plate collectors are self-contained for manufacture elsewhere and installation on a finished roof structure, they tend to add considerably to the weight imposed upon such roof structures, thereby requiring support structures having greater load capacities at increased expense or, in the case of pre-existing structures not designed for the imposition of such additional loads, substantially limiting their application. A second major deficiency with such self-contained prior art flat plate collectors lies in their duplicity of several elements already present in the finished roof structures to which they are attached. For example, in such an installation both the flat plate collector and the roof structure include a weather-resistant outer material, a rigid self-supporting frame, and a layer of thermally insulative material. This duplicity of elements further increases the weight imposed by the flat plate solar collectors on the roof structure and necessitates a higher cost to the user.

It is known to incorporate portions of a solar collector into a roof structure. For example, the Cummings U.S. Pat. No. 4,201,188 shows a roof surface comprising an inclined light-transparent front wall with a cavity collector unit positioned therebehind in the attic of a structure. Corrugated heat traps are arrayed in the cavity collector unit. A roof structure incorporating a metal layer with water circulating channels positioned between a waterproofing layer and an insulating layer is disclosed in the Ronc U.S. Pat. No. 4,201,193. However, neither of the devices shown in the above patents provides all of the advantages of flat plate solar collectors including their relatively small space requirements and their absorption of both direct solar radiation and reradiation.

Another type of solar heat collector incorporated into a roof structure is exemplified in the Weinstein U.S. Pat. No. 4,141,339 wherein an air box of rigid insulated material is nested between framing members with a cover supported on their exterior faces. The box and glazing cover are movable relative to each other to accomodate differential thermal expansion and contraction. However, the last mentioned type of collector is susceptible to the inherent problems with utilizing air as the heat transfer medium, such as the requirement of providing sufficient air turbulence for good heat transfer and generally lower efficiencies in comparison with collectors utilizing water as the heat transfer fluid.

Prior art solar collectors have tended to be either relatively heavy, complex in structure and manufacture, or relatively inefficient as heat transfer devices.

SUMMARY OF THE INVENTION

In the practice of the present invention, a solar collector is provided for integral attachment to the framing members of a structure. The collector includes a pair of base panel support members each attached to and extending longitudinally along a respective framing member side face. The base panel support members each terminate in an outer edge in spaced relation from a respective outer edge of the framing member. A base panel is connected to the base panel support members and extends between the framing member side faces. An extruded metal collector plate includes a web having opposite side margins and a tubular fluid conduit which extends along the web in spaced relation between the side margins and protrudes upwardly from the web. The collector plate includes opposite inlet and outlet ends.

The collector plate is attached to the base panel by mechanical fasteners at its side margins, each mechanical fastener having a head positioned outwardly of the side margin and a shank embedded in the base panel. An inlet and an outlet header are connected to the inlet and outlet collector plate ends for communicating fluid with the fluid conduit. Each header extends transversely between the framing members and also extends through a pair of elongated, transverse slots each through a respective framing member. A first transparent cover is attached to the framing member outer edges and extends therebetween in spaced relation outwardly of the collector plate. The second transparent cover is positioned in spaced relation outwardly of the first transparent cover and is attached to spacer strips positioned between the first and second transparent covers. Ceiling panels are attached to inner edges of the framing members and a layer of thermal insulative material is positioned between the ceiling panels and the base panels.

The solar collector of the present invention is relatively light in weight because it is integrally constructed with and supported by the framing members of the structure. Simplicity and economy in construction are achieved because the transparent covers comprise the weather-resistant outer surface of the structure, the layer of thermally insulative material prevents heat loss from both the solar collector and the structure, and the collector is supported by and framed by the structure's framing members. Differential thermal expansion and contraction between the collector plate and other portions of the collector and the structure are accomodated because the mechanical fasteners movably retain the collector plate against the base panel for relative movement therebetween. Also, the headers are allowed to shift longitudinally with respect to the structural members within the elongated transverse slots through the rafters.

The principal objects of the present invention are: to provide a solar collector which is relatively light in weight; to provide such a collector which is integrally attached to and supported by the framing members of a structure; to provide such a collector which is incorporated into a roof structure; to provide such a collector which is constructed in situ with the structure; to provide such a collector which accomodates differential thermal expansion and contraction between a collector plate and other portions of the collector and the structure; to provide such a collector with a transparent cover forming a weather-resistant outside surface of a structure; to provide such a collector with a layer of thermally insulative material for preventing heat loss from the collector and the structure; to provide such a collector which utilizes water or other liquid as a heat transfer fluid; to provide such a collector which is capable of a long operating life; and to provide such a collector which is particularly well adapted for the proposed use.

Other objects and advantages of this invention will become apparent from the following description taken in conjunction with the accompanying drawings wherein are set forth, by way of illustration and example, certain embodiments of this invention.

BRIEF DESCRIPTION OF THE DRAWINGS

FIG. 1 is a fragmentary, perspective view of a solar collector embodying the present invention, shown incorporated into a roof structure.

FIG. 2 is an enlarged, fragmentary, sectional view of the collector taken generally along line 2—2 in FIG. 3.

FIG. 3 is an enlarged, fragmentary, top plan view of the collector with portions thereof broken away to reveal internal construction and particularly showing an inlet header.

FIG. 4 is an enlarged, fragmentary, sectional view of the collector taken generally along line 4—4 in FIG. 3 and particularly showing an extruded metal collector plate.

FIG. 5 is an enlarged, vertical, sectional view of the collector taken generally along line 5—5 in FIG. 1.

DESCRIPTION OF THE PREFERRED EMBODIMENTS

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

For purposes of description herein, the terms "upper", "lower", "vertical", "horizontal", and derivitives thereof shall relate to the invention as oriented in FIG. 1, however, it is to be understood that while the invention may assume various alternative orientations, it is not to be limited thereto except where expressly specified to the contrary.

Referring to the drawings in more detail, the reference numeral 1 generally designates a solar collector embodying this invention. The collector 1 is incorporated in and integral with a roof structure 2 including a plurality of parallel, spaced rafter framing members 3 which provide the primary structural support for the roof structure 2. Each rafter 3 includes an opposite pair of side faces 6, an inner edge 7, and an outer edge 8, all extending longitudinally therewith. In conventional wood framing construction the rafters 3 may comprise boards having nominal cross-sectional dimensions of, for example, 2 inches across their edges 7 and 8 and 6 inches across their side faces 6 respectively (2×6's). In constructing the roof structure 2, the rafters 3 are placed parallel to each other at a predetermined spacing and slope upwardly from a wall structure (not shown) to a ridge beam 9.

A pair of base panel support members 11 each having an inner edge 12 and an outer edge 13 are placed against the respective side faces 6 of each rafter 3 and extend longitudinally therewith. As shown in FIG. 2, the base panel support member inner edges 12 are positioned flush with the respective rafter inner edges 7 and their outer edges 13 are positioned in spaced relation inwardly of the respective rafter outer edges 8. The base panel support members 11 may comprise, for example, boards having nominal cross-sectional dimensions of 1 inch across their edges 12 and 13 and 4 inches therebetween (1×4's). A base panel 15 extends between each respective pair of adjacent rafters 3 and includes an inner surface 16 attached to a respective pair of support member outer edges 13 and an outer surface 17 positioned in spaced relation inwardly of the rafter outer edges 8. The base panel 15 preferably has a substantially flat configuration and may comprise plywood having a thickness of, for example, one-half inch between the surfaces 16 and 17.

A plurality of juxtaposed collector plates 20 are placed on each base panel 11 and extend longitudinally in a direction parallel to the rafters 3. Each collector plate 20 comprises a web 21 with opposite side margins 22 and a tubular fluid conduit 23. Preferably, the collector plates 20 comprise extruded aluminum. The collector plates 20 may also comprise other extrudable materials such as copper or a polymeric material with a dark-colored additive such as carbon black. However, aluminum is particularly well adapted to the design of the solar collector 1 because of its relatively high heat absorptivity, its extrudability, its relatively low cost in comparison with more expensive metals such as copper, and its relatively light weight. Each tubular fluid conduit 23 terminates in an upper inlet end 24 and a lower outlet end 25. Because the collector plates 20 are extruded with their respective webs 21 and fluid conduits 23 as one piece, good thermal conductivity is maintained therebetween and the problems associated with fastening together such pieces which have been formed separately, as by soldering, are avoided. Also, because each fluid conduit 23 is extruded separately with an integrally attached web 21, the transverse width between the web side margins 22 may be maintained relatively small for efficient extruding. Further, because a plurality of separate and relatively narrow collector plates 20 are utilized, differential thermal expansion and contraction are better accomodated than with collector plates having wider web portions with a plurality of fluid conduits, as will be described in more detail herein.

With the collector plates 20 positioned on the base panel 15 in juxtaposed relation, each adjacent pair of respective side margins 22 is positioned in spaced relation whereby a longitudinal gap 31 is defined therebetween. The collector plates 20 are attached to the base panels 15 by mechanical fasteners 32 each having a head 33 and a shank 34 extending through a respective gap 31 and fixedly embedded in a respective base panel 15. As shown in FIG. 4, the mechanical fasteners 32 may comprise ordinary galvanized roofing nails, or other types of mechanical fasteners such as screws. The mechanical fasteners 32 retain the collector plates loosely against the base panel 11 whereby relative movement therebetween is accomodated.

With the collector plates 20 retained in this manner, a significant amount of movement relative to the collector base panels 11 in response to differential thermal expansion and contraction may occur. Such relative differential movement is particularly anticipated in the collector 1 because of the relatively wide temperature variations to which the collector plates 20 will be subjected. For example, during periods of exposure to maximum solar insolation, the aluminum collector plates 20 may reach temperatures near the boiling point of water. Conversely, at night the temperature of the collector plates 20 will be nearly that of the ambient air. Therefore, because the gaps 31 have slightly greater widths than the thicknesses of the mechanical fastener shanks 34 and the mechanical fastener heads 33 only loosely retain the collector plate webs 21, portions of the collector plates 20 are allowed to slide longitudinally relative to the respective base panels 11 and also expand and contract transversely relative thereto.

An outlet and an inlet header 41 and 42 respectively communicate a heat transfer fluid to the fluid conduits 23. Each header 41 and 42 comprises a plurality of "T" connectors 43 each corresponding to and positioned adjacent a respective collector plate inlet end 25 or outlet end 24. Each "T" connector 43 is coupled to a respective fluid conduit 23 by a coupler 44 inserted partially into the conduit 23 and partially into the "T" connector 43. Each coupler 44 includes an "O" ring 45 therearound for effecting a fluid tight seal with the fluid conduit 23. Pipes 47 each extend transversely through a respective rafter 3 between its side edges 6 (FIG. 3) and interconnect respective pairs of "T" connectors 43. The elongated slots 48 each open onto a respective rafter outer edge 8. The sliding engagement of the connector pipes 47 within respective elongated slots 48 comprises a second feature of the collector 1 which accomodates differential thermal expansion and contraction. Thus, as the collector plates 20 expand and contract in response to heating and cooling cycles, the respective headers 41 and 42 will be moved longitudinally relative to the rafters 3 with their connector pipes 47 sliding within the elongated slots 48 to accomodate such movement.

A first transparent cover 50 is placed over the rafter outer edges 8 in spaced covering relation outwardly of the collector plates 20 and comprises, for example, a relatively thin sheet of synthetic resin polymer, such as the material marketed under the trademark Teflon and designated for such applications. The inner transparent cover 50 is attached to each rafter 3 by a respective spacer strip 51 having an inner and an outer face 52 and 53 respectively. The inner transparent cover 50 is clamped between the rafter outer edge 8 and the spacer strip inner face 52 (FIG. 2).

An outer transparent cover 60 comprises a transparent polymeric or glass material and is positioned in covering relation outwardly of the inner transparent cover 50, defining an air space 64 therebetween. The outer transparent cover is attached to each spacer strip outer face 53 by a respective cover strip 61 having an inner and an outer face 62 and 63 respectively. The outer transparent cover is thus clamped between the spacer strip outer faces 53 and the cover strip inner faces 62. In overlying order, the rafters 3, the inner transparent cover 50, the spacer strips 51, the outer transparent cover 60, and the cover strips 61 are clamped together by bolts 65.

The solar collector 1 is designed to be constructed in situ integrally with the roof structure 2. With the rafter framing members 3 erected, the base panel support members 11 are nailed thereto as shown. An upper and a lower transverse member 71 and 72 respectively are placed between each adjacent pair of rafters 3 and attached thereto as shown in FIGS. 3 and 5. Base panel support members 11 are attached in opposing relation to the transverse members 71 and 72 and extend between the adjacent rafter side faces 6.

Ceiling panels 76 are attached to the rafter inner edges 12 and comprise a finished ceiling surface for the underlying structure. Alternatively, if an attic is to be provided, the ceiling panels 76 may be omitted from the roof structure 2. A layer of insulating material 77 is placed between each pair of adjacent rafters 3 and against the outside of respective ceiling panels 76. The insulating material 77 serves to thermally insulate both the underlying structure from external heat loss through the roof structure 2 and the collector panels 20 from heat loss into the underlying structure. The remainder of the roof structure 2 is then covered with a weather-resistant material such as shingles 81. Between the shingles 81 and the outer transparent cover 60 along the upper edge of the solar collector 1, a strip of metal flashing 82 is positioned as shown in FIG. 5 to prevent precipitation from entering the collector 1.

Efficiency and relatively low cost are achieved by constructing the solar collector 1 with conventional wood framing members and relatively low cost, light weight collector plates 20 of extruded aluminum. Also, several portions of the solar collector 1 have dual functions with both the collector 1 and the roof structure 2. The outer transparent cover 60 provides a weather-resistant exterior surface for both the collector 1 and the roof structure 2, thereby obviating the requirement of an underlying waterproof roof covering below the solar collector 1. Also, the layer of insulating material 77 provides a thermal barrier from heat loss from both the solar collector 1 and the underlying structure. Further, the rafters 3 provide structural framing members for both the solar collector 1 and the roof structure 2, thereby obviating the need for a separate rigid frame for the solar collector 1.

In operation, the solar collector 1 receives solar insolation through the inner and outer transparent covers 50 and 60, whereby the collector plates 20 are heated. The solar insolation may comprise both direct collimated sun rays and reradiation of refracted light rays within the solar collector 1. The air space 64 between the inner and outer transparent covers 50 and 60 respectively provides thermal insulation to reduce the radiant heat loss from the collector plates 20 to the atmosphere, although a single transparent cover could be utilized in the practice of the present invention, thereby reducing the expense thereof. A heat transfer fluid 85 containing antifreeze to prevent freezing during non-heating periods, such as water, is pumped through the inlet header 42 and enters the respective fluid conduits 23 by way of respective "T" connectors 43. The fluid 85 flows upwardly through the fluid conduits 23, gathering heat by convection with the heated collector plates 20. The heat transfer fluid 85 enters the outlet header 41 by way of respective "T" connectors 43 and is communicated to the underlying structure for use therein for, by way of example, space heating, absorption air conditioning, and the heating of domestic hot water.

It is to be understood that while I have illustrated and described certain forms of my invention, it is not to be limited to the specific forms or arrangement of parts herein described and shown.

What is claimed and desired to secure by Letters Patent is:

1. In combination with a structure having elongated, substantially parallel framing members each having a side face, an inner edge and an outer edge, a solar collector comprising:
   (a) a pair of base panel support members each attached to a respective framing member side face in spaced relation from and substantially parallel to a respective framing member outer edge;
   (b) a base panel having an outer surface and connected to said base panel support members, said base panel extending between an opposed pair of said framing member side faces;
   (c) a plurality of juxtaposed extruded metal collector plates positioned on said base panel outer surface, each of said collector plates comprising:
      (1) an inlet end;
      (2) an outlet end;
      (3) a web having opposite side margins; and
      (4) a fluid conduit terminating at and open at said inlet and said outlet ends;
   (d) said adjacent pair of framing members each having a first and a second elongated slot, each of said elongated slots opening onto a respective framing member outer edge;
   (e) an inlet header positioned in said first slots for relative movement with respect to said framing members, said inlet header being attached to said collector plate inlet ends and communicating fluid with said fluid conduits;
   (f) an outlet header positioned in said second elongated slots and movable therein relative to said framing members, said outlet header being connected to said collector plate outlet ends and communicating fluid with said fluid conduits;
   (g) a plurality of mechanical fasteners each positioned at a respective web side margin for loosely retaining said collector plates against said base panel outer surface, each of said mechanical fasteners comprising:
      (1) a head positioned outwardly of a respective web; and
      (2) a shank fixedly embedded in said base panel adjacent a respective web side margin;
   (h) a transparent cover attached to and extending between said framing member outer edges;
   (i) a ceiling panel attached to and extending between said framing member inner edges; and
   (j) a layer of thermally insulating material positioned between said base panel and said ceiling panel.

2. The solar collector as set forth in claim 1 which includes:
   (a) said transparent cover comprising a first transparent cover;
   (b) a plurality of spacer strips each positioned over and longitudinally aligned with a respective framing member outer edge; said first transparent cover being positioned between said outer edges and said spacer strips;
   (c) a second transparent cover attached to and extending between said spacer strips in spaced relation outwardly of said first transparent cover;
   (d) a plurality of cover strips each positioned outwardly of and longitudinally aligned with a respective spacer strip; said second transparent cover being positioned between said spacer strips and said cover strips; and
   (e) a plurality of mechanical fasteners each extending through a respective cover strip, a respective spacer strip, and into a respective framing member for retaining said first and second transparent covers tightly clamped between said cover strips, spacer strips and said outer edges respectively.

* * * * *